United States Patent
Hasegawa et al.

(10) Patent No.: US 12,341,257 B2
(45) Date of Patent: Jun. 24, 2025

(54) PHASED ARRAY ANTENNA, TRANSMISSION APPARATUS, RADIO-POWER TRANSMISSION SYSTEM AND RADIO COMMUNICATION SYSTEM

(71) Applicant: SoftBank Corp., Tokyo (JP)

(72) Inventors: Naoki Hasegawa, Tokyo (JP); Yoshichika Ota, Tokyo (JP)

(73) Assignee: SoftBank Corp., Tokyo (JP)

( * ) Notice: Subject to any disclaimer, the term of this patent is extended or adjusted under 35 U.S.C. 154(b) by 437 days.

(21) Appl. No.: 17/792,156

(22) PCT Filed: Dec. 8, 2020

(86) PCT No.: PCT/JP2020/045683
§ 371 (c)(1),
(2) Date: Jul. 12, 2022

(87) PCT Pub. No.: WO2021/149378
PCT Pub. Date: Jul. 29, 2021

(65) Prior Publication Data
US 2023/0045955 A1 Feb. 16, 2023

(30) Foreign Application Priority Data
Jan. 21, 2020 (JP) .................................. 2020007751

(51) Int. Cl.
*H01Q 3/42* (2006.01)
(52) U.S. Cl.
CPC .................................... *H01Q 3/42* (2013.01)
(58) Field of Classification Search
CPC ........ H01Q 3/30–42; H02J 50/23; H04B 1/04
See application file for complete search history.

(56) References Cited

U.S. PATENT DOCUMENTS 3,307,188 A * 2/1967 Marchetti ................ H01Q 3/42
331/38
4,731,614 A * 3/1988 Crane ...................... H01Q 3/42
342/372

(Continued)

FOREIGN PATENT DOCUMENTS

| CN | 110048241 A | 7/2019 |
| JP | 2017-28488 A | 2/2017 |
| JP | 6456579 B1 | 12/2018 |

OTHER PUBLICATIONS

Justin D. Roque, et al., "A Full-Duplex, Single-Frequency-Controlled Phased Array," Department of Electrical Engineering, University of Hawaii, 0-7803-9542-5/06/$20.00 ©2006 IEEE.

(Continued)

*Primary Examiner* — Cassi J Galt
(74) *Attorney, Agent, or Firm* — Westborough IP Group, LLC

(57) ABSTRACT

Provided is a two-dimensional phased array antenna having a simple configuration capable of reducing the number of control systems and the number of control input ports for phase control of antenna elements. The phased array antenna comprises a plurality of antenna elements arranged in a first direction and a second direction intersecting the first direction, a plurality of frequency mixers for respectively supplying transmission signals with a predetermined transmission frequency (f) to the plurality of antenna elements, and means for generating a plurality of first mixing signals having a predetermined first phase difference ($\Delta\varphi_1$) between the antenna elements adjacent to each other in the first direction and a plurality of second mixing signals having a predetermined second phase difference ($\Delta\varphi_2$) between the antenna elements adjacent to each other in the second direction, based on three frequency-controllable input signals with respective frequencies different from each other, (Continued)

and supplying the plurality of first mixing signals and the plurality of second mixing signals to the plurality of frequency mixers.

12 Claims, 10 Drawing Sheets

(56) References Cited

U.S. PATENT DOCUMENTS

| | | | |
|---|---|---|---|
| 5,952,964 A * | 9/1999 | Chan | H01Q 21/065 342/368 |
| 10,446,928 B2 | 10/2019 | Takahashi | |
| 2014/0227982 A1 | 8/2014 | Granger-Jones et al. | |

OTHER PUBLICATIONS

Monte K. Watanabe, et al., "A 2-D Phase-Detecting/Heterodyne-Scanning Retrodirective Array," IEEE Transactions On Microwave Theory and Techniques, vol. 55, No. 12, Dec. 2007.
Chinese Office Action, Dated Dec. 31, 2024.

* cited by examiner

PHASED ARRAY ANTENNA, TRANSMISSION APPARATUS, RADIO-POWER TRANSMISSION SYSTEM AND RADIO COMMUNICATION SYSTEM

TECHNICAL FIELD

The present invention relates to a phased array antenna in which a plurality of antenna elements are arranged, a transmission apparatus, a radio-power transmission system and a radio communication system.

BACKGROUND ART

There is conventionally known an antenna that has plural antenna elements arranged two-dimensionally and can control a directivity pattern (beamforming) of the whole antenna by controlling a phase and an amplitude of a signal of each antenna element.

Patent Literature 1 discloses a phased array antenna, in which plural phase shifters are provided so as to respectively correspond plural antenna elements, and each phase shifter is controlled by a control apparatus. In this phased array antenna, the control apparatus calculates a phase shift value of each phase shifter and transmits the phase shift value to each phase shifter. A signal generated by one signal source is distributed to plural signals by a distribution circuit, and each of the plural signals outputted from the distribution circuit is phase-shifted by the phase shifter, amplified by an amplifier, and supplied to the antenna element.

Non-Patent Literature 1 discloses a frequency controlled one-dimensional phased array antenna, in which plural frequency mixers (mixers) are provided so as to respectively correspond to plural antenna elements. In this one-dimensional phased array antenna, a signal with a local oscillation frequency ($4f$) of the same phase, and a high frequency ($f+\Delta f$) signal having a predetermined phase difference ($4$) sequentially in order between the antenna elements in the arrangement direction of the antenna elements are input to each frequency mixer. As a circuit for supplying the high frequency ($f+\Delta f$) signal to each frequency mixer in the control system, a transmission line (for example, leakage wave circuit substrate) is used, which forms the predetermined phase difference ($\Delta \varphi$) by a transmission line length.

Non-Patent Literature 2 discloses a frequency-controlled two-dimensional phased array antenna, in which a plurality of frequency mixers (mixers) are provided so as to respectively correspond to a plurality of antenna elements. In this two-dimensional phased array antenna, with respect to one antenna-element alignment direction among two antenna-element alignment directions that are orthogonal to each other, a signal with a local oscillation frequency ($f_{LO}+\Delta f_1$) having a predetermined phase difference ($\Delta \varphi_1$) sequentially in order between the antenna elements in the antenna-element arrangement direction is input to the frequency mixer. With respect to the other antenna-element arrangement direction, a high frequency ($f_{RF}+\Delta f_2$) signal having a predetermined phase difference ($\Delta \varphi_2$) sequentially in order between the antenna elements in the antenna-element arrangement direction is input to the frequency mixer. As a circuit for supplying a signal of the local oscillation frequency ($f_{LO}+\Delta f_1$) to each frequency mixer in the control system, a transmission line (for example, leakage circuit substrate) is used, which has two input ports for inputting two signals of $f_{LO}$ and $\Delta f_1$ and a frequency mixer (mixer) for inputting and forms the predetermined phase difference ($\Delta \varphi_1$) by a transmission line length. Further, as a circuit for supplying the high frequency ($f_{RF}+\Delta f_2$) signal to each frequency mixer, a transmission line (for example, leakage circuit substrate) is used, which has two input ports for inputting two signals of $f_{RF}$ and $\Delta f_2$ and a frequency mixer (mixer) for inputting and forms the predetermined phase difference ($\Delta \varphi_2$) by a transmission line length.

CITATION LIST

Patent Literature

Patent Literature 1: Japanese Patent No. 6456579.

Non-Patent Literature

Non-Patent Literature 1: J. D. Roque, G. S. Shiroma and W. A. Shiroma, "A Full-Duplex, Single-Frequency-Controlled Phased Array," 2006 IEEE MTT-S International Microwave Symposium Digest, San Francisco, CA, 2006, pp. 453-456.

Non-Patent Literature 2: M. K. Watanabe, R. N. Pang, B. O. Takase, J. M. Akagi, G. S. Shiroma and W. A. Shiroma, "A 2-D Phase-Detecting/Heterodyne-Scanning Retrodirective Array," in IEEE Transactions on Microwave Theory and Techniques, vol. 55, no. 12, pp. 2856-2864, December 2007.

SUMMARY OF INVENTION

Technical Problem

The conventional phased array antenna has the following problems.

In the phased array antenna of Patent Literature 1, plural control systems provided so as to respectively correspond to plural phase shifters are required, and the control systems are complicated. In particular, while a large-aperture phased array antenna is required for a long-distance radio communication and a radio power transmission that perform two-dimensional beamforming, when trying to control the phase shifter of each antenna element by increasing the number of the antenna elements to consist of a large-aperture phased array antenna, this leads to an increase in the number of control systems.

In the one-dimensional phased array antenna of Non-Patent Literature 1, it is not possible to control a two-dimensional directivity pattern (beamforming).

In the two-dimensional phased array antenna of Non-Patent Literature 2, although two-dimensional directivity patterns (beamforming) can be controlled with a configuration that reduces the number of control systems, there is a demand for a simple configuration by reducing the number of control input ports in the control system.

Solution to Problem

A phased array antenna according to an aspect of the present invention comprises a plurality of antenna elements arranged in a first direction and a second direction intersecting the first direction, a plurality of frequency mixers for respectively supplying transmission signals with a predetermined transmission frequency (f) to the plural antenna elements, and means for generating a plurality of first mixing signals having a predetermined first phase difference ($\Delta \varphi_1$) between antenna elements adjacent to each other in the first direction and a plurality of second mixing signals having a predetermined second phase difference ($\Delta \varphi_2$)

between antenna elements adjacent to each other in the second direction, based on three frequency-controllable input signals with respective frequencies different from each other, and supplying the plurality of first mixing signals and the plurality of second mixing signals to the plurality of frequency mixers.

A phased array antenna of a first aspect according to another aspect of the present invention comprises a plurality of linear array sections that respectively include a plurality of antenna elements arranged in a first direction and are arranged in a second direction intersecting the first direction. The phased array antenna further comprises a plurality of first mixing-signal processing sections, which are provided so as to respectively correspond to the plurality of linear array sections, comprise a plurality of frequency mixers that supply transmission signals with a predetermined transmission frequency (0, to the plurality of antenna elements of the linear array section, and supply the plurality of first mixing signals with a frequency $(f+\Delta f_1)$ that is a sum of the transmission frequency (f) and the first variable frequency $(\Delta f_1)$ and having the predetermined first phase difference $(\Delta \varphi_1)$ between the antenna elements adjacent to each other in the arrangement direction of the plurality of antenna elements of the linear array section, to the plurality of frequency mixers. The phased array antenna further comprises a first signal-dividing section for dividing a first input signal having a frequency $(f+\Delta f_1)$ that is a reference of the plurality of first mixing signals having the first phase difference $(\Delta \varphi_1)$, and respectively supplying the first input signal to the plurality of first mixing-signal processing sections. The phased array antenna further comprises a second mixing-signal processing section for outputting the plurality of second mixing signals with the first variable frequency $(\Delta f_1)$ having a predetermined second phase difference $(\Delta \varphi_2)$ between the linear array sections adjacent to each other in the arrangement direction of the plurality of linear array sections The phased array antenna further comprises a plurality of second signal-dividing sections, which are provided so as to respectively correspond to the plural linear array sections, respectively divide the second mixing signals with the first variable frequency $(\Delta f_1)$ having the second phase difference $(\Delta \varphi_2)$ outputted from the second mixing signal processing section, and supply the plurality of second mixing signals to the plurality of frequency mixers of the linear array section.

In the foregoing phased array antenna of the first aspect, each of the plurality of first mixing-signal processing sections may include a first transmission member that is input with a first reference signal with the frequency $(f+\Delta f_1)$ supplied from the first signal-dividing section, forms the first phase difference $(\Delta \varphi_1)$ by a transmission path length and outputs the plurality of first mixing signals with the frequency $(f+\Delta f_1)$. The second mixing-signal processing section may include a second transmission member that is input with a second input signal of a frequency $(f+\Delta f_2)$ of a sum of the transmission frequency (f) and the second variable frequency $(\Delta f_2)$, forms the second phase difference $(\Delta \varphi_2)$ by a transmission path length and outputs a plurality of intermediate signals with the frequency $(f+\Delta f_2)$. The second mixing-signal processing section may further include a third signal-dividing section for dividing a third input signal with a frequency $(f+\Delta f_2-\Delta f_1)$ that is a difference between the frequency $(f+\Delta f_2)$ of the intermediate signal and the first variable frequency $(\Delta f_1)$, into plural signals. The second mixing-signal processing section may further include a plurality of frequency mixers that are the plurality of intermediate signals with the frequency $(f+\Delta f_2)$ outputted from the second transmission member and the third input signal with the frequency $(f+\Delta f_2-\Delta f_1)$ divided by the third signal-dividing section, and output the plurality of second mixing signals with the first variable frequency $(\Delta f_1)$ having the second phase difference $(\Delta \varphi_2)$.

A phased array antenna of a second aspect according to yet another aspect of the present invention comprises a plurality of linear array sections that respectively include a plurality of plural antenna elements arranged in a first direction and are arranged in a second direction intersecting the first direction. The phased array antenna further comprises a plurality of first mixing-signal processing sections, which are provided so as to respectively correspond to the plurality of linear array sections, comprise a plurality of frequency mixers that supply transmission signals with a predetermined transmission frequency (f) to the plurality of antenna elements of the linear array section, and supply the plurality of first mixing signals with a first variable frequency $(\Delta f_1)$ having a predetermined first phase difference $(\Delta \varphi_1)$ and second phase difference $(\Delta \varphi_2)$ between the antenna elements adjacent to each other in the arrangement direction of the plurality of antenna elements of the linear array section, to the plurality of frequency mixers. The phased array antenna further comprises a first signal-dividing section for dividing a first input signal with a frequency $(f+\Delta f_1)$ that is a sum of the transmission frequency (f) and the first variable frequency $(\Delta f_1)$. The phased array antenna further comprises a plurality of second signal-dividing sections that are provided so as to correspond to the plurality of linear array sections and further divide the first input signal supplied from the first signal-dividing section and supply the first input signal to the plurality of frequency mixers as the second mixing signal. The phased array antenna further comprises an intermediate-signal supplying section for supplying a plurality of intermediate signals with the first variable frequency $(\Delta f_1)$ having the second phase difference $(\Delta \varphi_2)$ between the linear array sections adjacent to each other in the arrangement direction of the plurality of linear array sections, to the plurality of first mixing-signal processing sections.

In the foregoing phased array antenna of the first aspect, each of the plurality of first mixing-signal processing sections may include a first transmission member that is input with an intermediate signal with the first variable frequency $(\Delta f_1)$ supplied from the intermediate-signal supplying section, forms the first phase difference $(\Delta \varphi_1)$ by a transmission path length and outputs the plurality of first mixing signals with the first variable frequency $(\Delta f_1)$. The intermediate-signal supplying section may include a second transmission member that is input with a second input signal of a frequency $(f+\Delta f_2)$ of a sum of the transmission frequency (f) and the second variable frequency $(\Delta f_2)$, forms the second phase difference (42) by a transmission path length and outputs a plurality of intermediate signals with the frequency $(f+\Delta f_2)$. The intermediate-signal supplying section may further include a third signal-dividing section for dividing a third input signal with a frequency $(f+\Delta f_2-\Delta f_1)$ that is a difference between the frequency $(f+\Delta f_2)$ and the first variable frequency $(\Delta f_1)$, into plural signals. The intermediate-signal supplying section may further include a plurality of frequency mixers for mixing the plurality of intermediate signals with the frequency $(f+\Delta f_2)$ outputted from the second transmission member and the third input signal with the frequency $(f+\Delta f_2-\Delta f_1)$ divided by the third signal-dividing section, and outputting the plurality of intermediate signals with the first variable frequency $(\Delta f_1)$.

In the foregoing phased array antenna, each of the first transmission member and the second transmission member may be a transmission-line substrate.

In the foregoing phased array antenna, the phased array antenna may comprise a plurality of transmission-line substrates that include the first transmission member and the plurality of frequency mixers in the first mixing-signal processing section and the frequency mixer in the second mixing-signal processing section, and the second transmission member of the second mixing-signal processing section or the second transmission member of the intermediate-signal supplying section may be a waveguide, and an output section for outputting the plurality of intermediate signals with the frequency $(f+\Delta f_2)$ may include a converter for converting the waveguide to a transmission line.

A transmission apparatus according to yet another aspect of the present invention comprises any one of the phased array antennas, and one or more frequency-controllable transmitters that generate the plurality of input signals supplied to the phased array antenna.

A radio-power transmission system according to yet another aspect of the present invention comprises any one of the phased array antennas as a transmission antenna for radio power transmission.

A radio communication system according to yet another aspect of the present invention comprises any one of the phased array antennas as a transmission antenna for radio communication.

The electromagnetic wave transmitted by the foregoing phased array antenna may be a microwave or a millimeter wave.

Advantageous Effects of Invention

According to the present invention, it is possible to provide a two-dimensional phased array antenna having a simple configuration capable of reducing the number of control systems and the number of control input ports for phase control of antenna elements.

DESCRIPTION OF EMBODIMENTS

Figure 1:
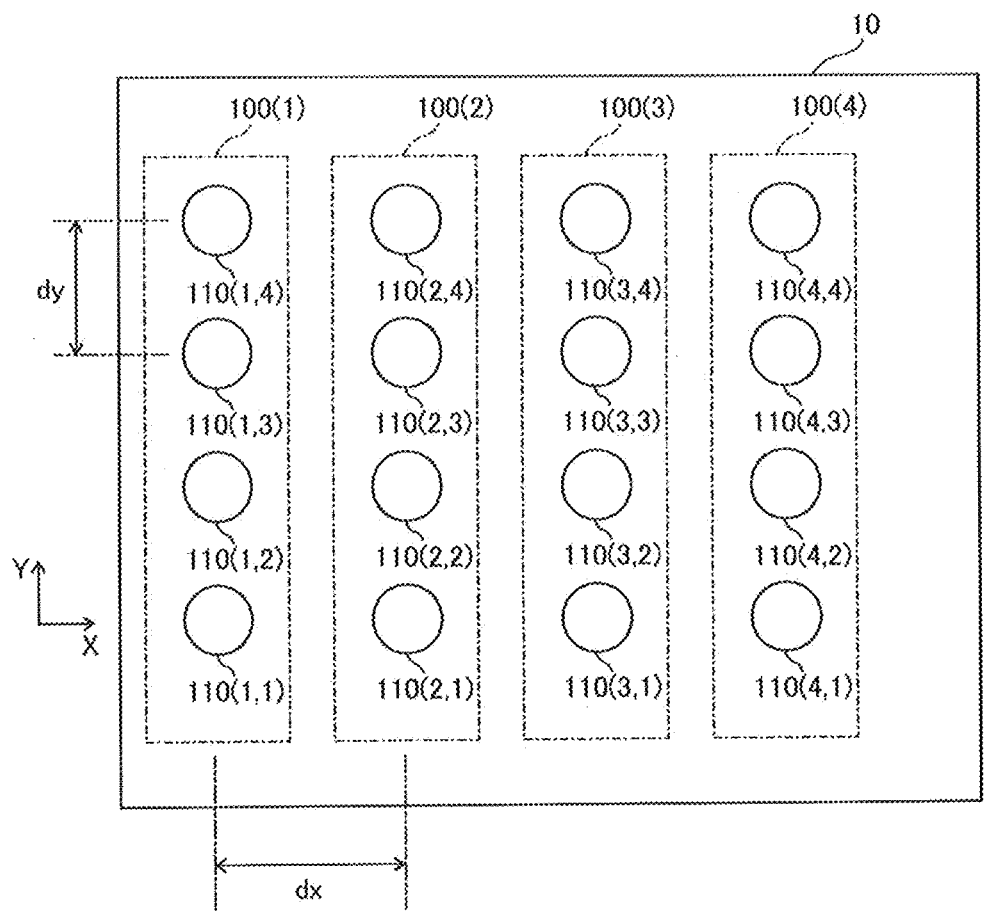
FIG. 1 is an illustration showing an arrangement example of antenna elements of a phased array antenna according to an embodiment of the present invention.

Hereinafter, embodiments of the present invention are described with reference to the drawings.

A phased array antenna according to the present embodiment is an antenna apparatus having a plurality of antenna elements arranged two-dimensionally or three-dimensionally. The phased array antenna is capable of performing a beamforming that controls the phase shift and signal of the transmission signal or reception signal among plural antenna elements and directs the directional main beam in any direction.

A phased array antenna of the present embodiment is suitable for a large-aperture transmission phased array antenna in a long-distance radio communication or a radio power transmission that requires the beamforming. A radio power transmission using microwaves not only requires the beamforming, but also requires an antenna aperture area according to a transmission distance. For example, when a power transmission target is a vehicle, etc. on the ground (power transmission distance is 1 m or less), the antenna aperture area is 1 m² or less, but when the power transmission target is a flying object (power transmission distance is 100 m or less) such as a drone that flies over a relatively low altitude (for example, 100 m or less), the antenna aperture area is assumed to be several m². When the transmission power target is a flying object (power transmission distance is 20 km or less) such as a stratosphere-staying type unmanned aerial vehicle, a stratosphere platform, or a HAPS (High Altitude Platform Station, High Altitude Pseudo Satellite) that flies in the stratosphere at a relatively high altitude (for example, several hundred meters or more and 20 km or less), the antenna aperture area is several 10 m². Further, when the power transmission target is a space-solar power plant or the like (for example, power transmission distance is 3600 km or less) located at a higher altitude (for example, several 10 km or more and 3600 km or less), the antenna aperture area is assumed to be several km². Since the antenna aperture area expands (the number of the antenna elements increases) according to the power transmission distance in radio transmission in this way, a simple and inexpensive phased array antenna is required. The phased array antenna of the present embodiment is suitable for a large-aperture phased array antenna capable of performing the beamforming, which is simple and inexpensive in such a long-distance radio power transmission system.

In the present embodiment, although the cases where a phased array antenna is mainly configured as a transmission antenna are described, a phased array antenna of the present embodiments can also be configured as a reception antenna. In the present embodiments, although the case of a phased array antenna such that the number of the antenna elements arranged two-dimensionally is 16 (=4×4) or the like are mainly described, the number of the antenna elements of the phased array antenna is not limited to the illustrated example.

FIG. 1 is an illustration showing an arrangement example of antenna elements of a phased array antenna according to an embodiment of the present invention. In FIG. 1, a phased array antenna 10 is a radio transmission apparatus that transmits electromagnetic waves of a predetermined frequency (for example, microwaves or millimeter waves) to transmit power, and is provided with four sets of linear array sections 100(1) to 100(4). Each of the four sets of linear array sections 100(1) to 100(4) is provided with four antenna elements 110(1,1) to 110(1,4), 110(2,1) to 110(2,4), 110(3,1) to 110(3,4), and 110(4,1) to 110(4,4) arranged at a predetermined interval dy in the Y direction (first direction) in the figure. The four sets of linear array sections 100(1) to 100(4) are arranged at a predetermined interval dx in the X direction (second direction) intersecting the Y direction in the figure. It is noted that, the interval dy in the Y direction and the interval dx in the X direction (second direction) of the antenna element 110 may be the same interval d.

Although the antenna element 110 is, for example, a dipole antenna, the antenna element 110 may be another type of antenna element such as a slot antenna, a horn antenna, or a microstrip antenna. The antenna element 110 may be an antenna capable of transmitting and receiving electromagnetic waves on a single plane of polarization, or may be an antenna capable of transmitting and receiving electromagnetic waves on plural planes of polarization or electromagnetic waves on a circular plane of polarization.

In the illustrated example, although the arrangement direction (X direction) of the linear array sections 100(1) to 100(4) is substantially orthogonal to the arrangement direction (Y direction) of the antenna elements in each linear array section, the crossing angle in the arrangement direction may deviate from 90 degrees. In the illustrated example, although the case where an arrangement surface of the antenna element is substantially flat is shown, the arrangement surface of the antenna element may be a curved surface.

Figure 2A:
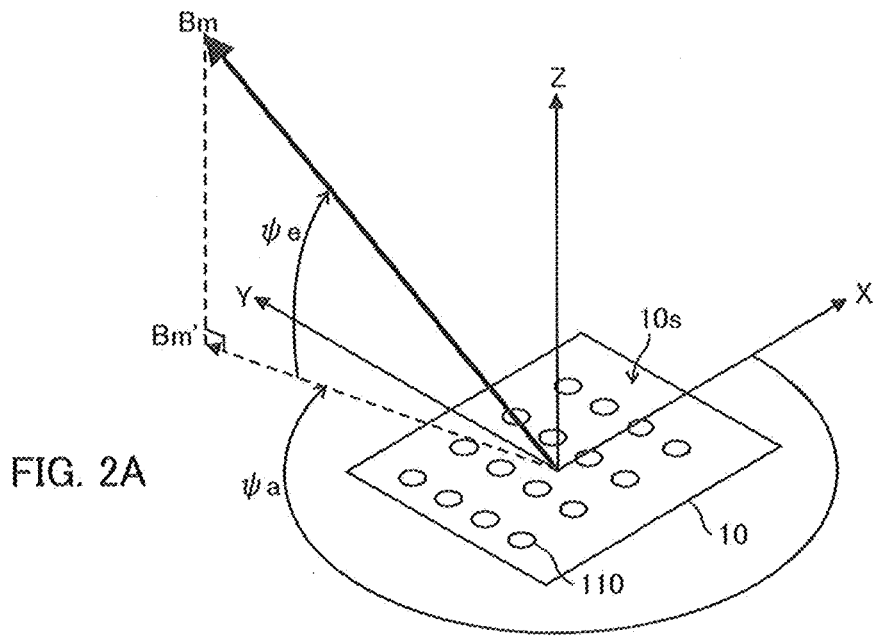
FIG. 2A is an illustration showing an example of a main direction of a directional beam that can be controlled in a phased array antenna according to the present embodiment.
Figure 2B:
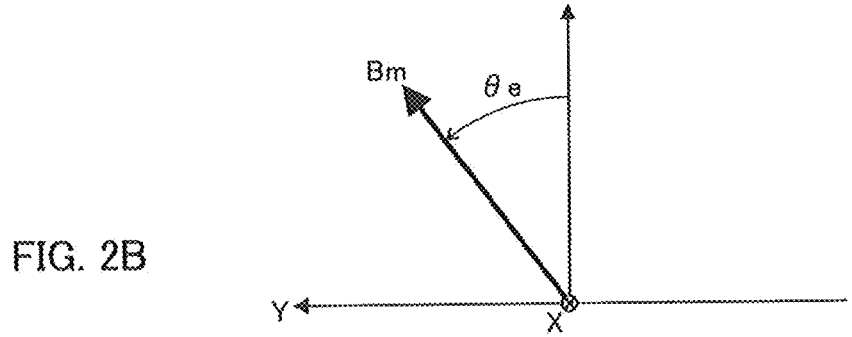
FIG. 2B is an illustration showing an example of a main direction of a directional beam that can be controlled in a phased array antenna according to the present embodiment.
Figure 2C:
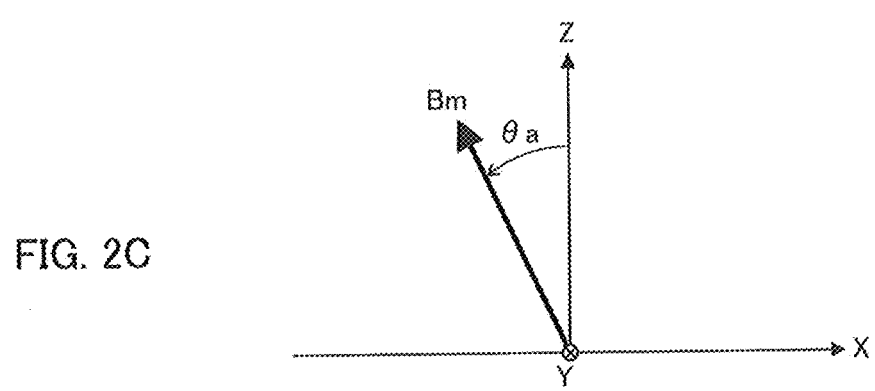
FIG. 2C is an illustration showing an example of a main direction of a directional beam that can be controlled in a phased array antenna according to the present embodiment.

Each of FIG. 2A to FIG. 2C is an illustration showing an example of the main direction of the directional beam Bm that can be controlled by the phased array antenna 10 according to the present embodiment. Each of the X-axis and the Y-axis in FIG. 2A to FIG. 2C is a coordinate axis (reference axis) orthogonal to each other defined on an element arrangement surface 10s on which the antenna element 110 of the phased array antenna 10 is arranged, and corresponds to the X-direction and the Y-direction in FIG. 1. The Z axis in FIG. 2A to FIG. 2C is an axis perpendicular to the element arrangement surface 10s of the phased array antenna 10. A beam steering, which changes a main direction of a directional beam Bm of the phased array antenna 10 around the Z axis, can be performed.

In FIG. 2A, an azimuth angle ψa and an elevation angle ψe are angles that define the main direction of the directional beam Bm of the electromagnetic wave transmitted and received by the phased array antenna 10. The azimuth angle ψa is an azimuth angle in the main direction of the directional beam Bm, and is an angle of projection direction Bm' in which the main direction of the directional beam Bm is projected onto the element arrangement surface 10s with reference to the X axis that is the reference axis on the element arrangement surface 10s. The elevation angle ψe is an elevation angle in the main direction of the directional beam Bm, and is an angle in the main direction of the directional beam Bm with respect to the element arrangement surface 10s.

FIG. 2B shows a beam steering angle θe in an elevation direction with respect to the Z axis in a Y-Z plane in the main direction of the directional beam Bm that can be controlled by the phased array antenna 10. The beam steering angle θe on the Y-Z plane can be changed by controlling a phase difference $\Delta\varphi e$ between the antenna elements arranged in a Y direction of the linear array section 100.

FIG. 2C shows a beam steering angle θa in an azimuth direction with respect to the Z axis in a Z-X plane in the main direction of the directional beam Bm that can be controlled by the phased array antenna 10. The beam steering angle θa on the Z-X plane can be changed by controlling a second phase difference $\Delta\varphi a$ between the antenna elements arranged in a X direction of the linear array section 100.

Figure 3:
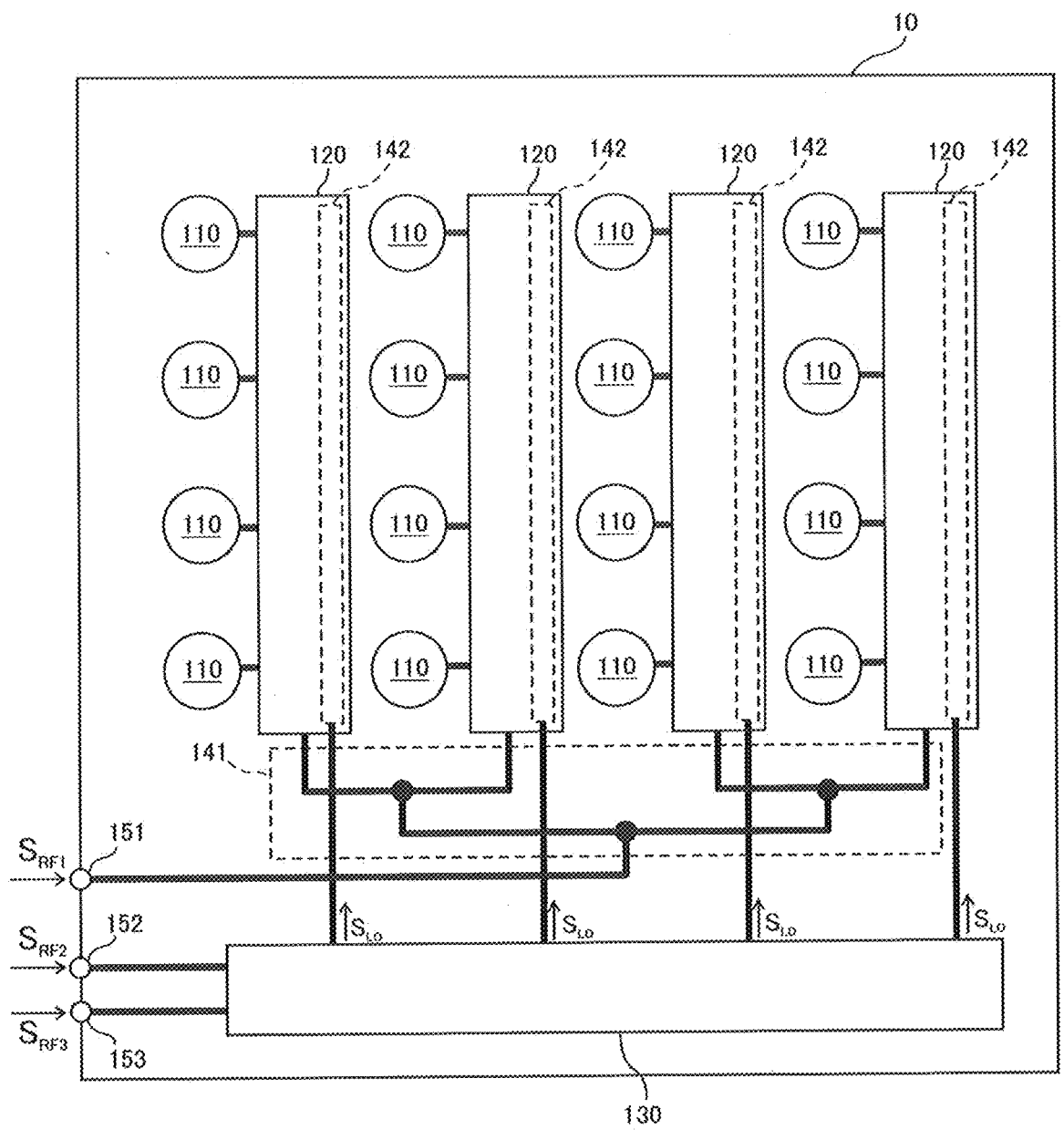
FIG. 3 is an illustration showing an example of a schematic configuration of a phased array antenna according to the present embodiment.

FIG. 3 is an illustration showing an example of a schematic configuration of the phased array antenna 10 according to the present embodiment. The phased array antenna 10 is provided with a plurality of first mixing-signal processing sections 120, a first signal-dividing section 141, a second mixing-signal processing section 130, and a plurality of second signal-dividing sections 142, in addition to the foregoing plural linear array sections 100(1) to 100(4).

The plurality of first mixing-signal processing sections 120 are provided so as to respectively correspond to the plurality of linear array sections 100(1) to 100(4), and include a plurality of frequency mixers for supplying transmission signals with a predetermined transmission frequency f to the plurality of antenna elements 110 of the linear array section 100. The plurality of first mixing-signal processing sections 120 supply a plurality of first mixing signal $S_{RF}$ with a frequency $(f+\Delta f_1)$ that is a sum of a transmission frequency f and a first variable frequency $(\Delta f_1)$, to the plurality of frequency mixers.

The foregoing plurality of first mixing signal $S_{RF}$ with the frequency $(f+\Delta f_1)$ have a predetermined first phase difference $(\Delta\varphi_1)$ between the antenna elements adjacent to each other in the arrangement direction of the plurality of antenna elements 110 of the linear array section 100. The first phase difference $(\Delta\varphi_1)$ is a phase difference for setting the beam steering angle θe (see FIG. 2B) in the elevation direction corresponding to the elevation angle ψe that is the elevation angle in the main direction of the directional beam Bm.

The first signal-dividing section 141 divides a first input signal $S_{RF1}$ with the frequency $(f+\Delta f_1)$ which is input from a first input port 151, and supplies the divided signals to each of the plurality of first mixing-signal processing sections 120. The first input signal $S_{RF1}$ is a reference signal for generating a plurality of first mixing signals $S_{RF}$ having the first phase difference $(\Delta\varphi_1)$.

The second mixing-signal processing section 130 outputs a plurality of second mixing signals $S_{LO}$ with the first variable frequency $(\Delta f_1)$, based on a second input signal $S_{RF2}$ of a frequency $(f+\Delta f_2)$ input from a second input port 152 and a third input signal $S_{RF3}$ of a frequency $(f+\Delta f_2[0]-\Delta f_1[0])$ input from a third input port 153. The first variable frequency $(\Delta f_1)$ can be changed and set by control. The $\Delta f_2$ in the frequency $(f+\Delta f_2)$ and the frequency $(f+\Delta f_2[0]-\Delta f_1[0])$ is a second variable frequencies $(\Delta f_2)$ that can be changed and set by control.

The plurality of second mixing signals $S_{LO}$ have a predetermined second phase difference $(\Delta\varphi_2)$ between the linear array sections adjacent to each other in the arrangement direction of the plural linear array sections 100(1) to 100(4). The second phase difference $(\Delta\varphi_2)$ is a phase difference for setting the beam steering angle θa (see FIG. 2C) in the azimuth direction corresponding to the azimuth angle ψa, which is the azimuth angle in the main direction of the directional beam Bm.

The plurality of second signal-dividing sections 142 are configured with, for example, Wilkinson Divider, and are provided so as to respectively correspond to the plural linear array sections 100(1) to 100(4). The plurality of second signal-dividing sections 142 respectively divide the plurality of second mixing signal $S_{LO}$ with the first variable frequencies ($\Delta f_1$) having the second phase difference ($\Delta\varphi_2$) outputted from the second mixing-signal processing section 130, and supply the divided signals to the plurality of frequency mixers of the linear array section 100.

Figure 4:
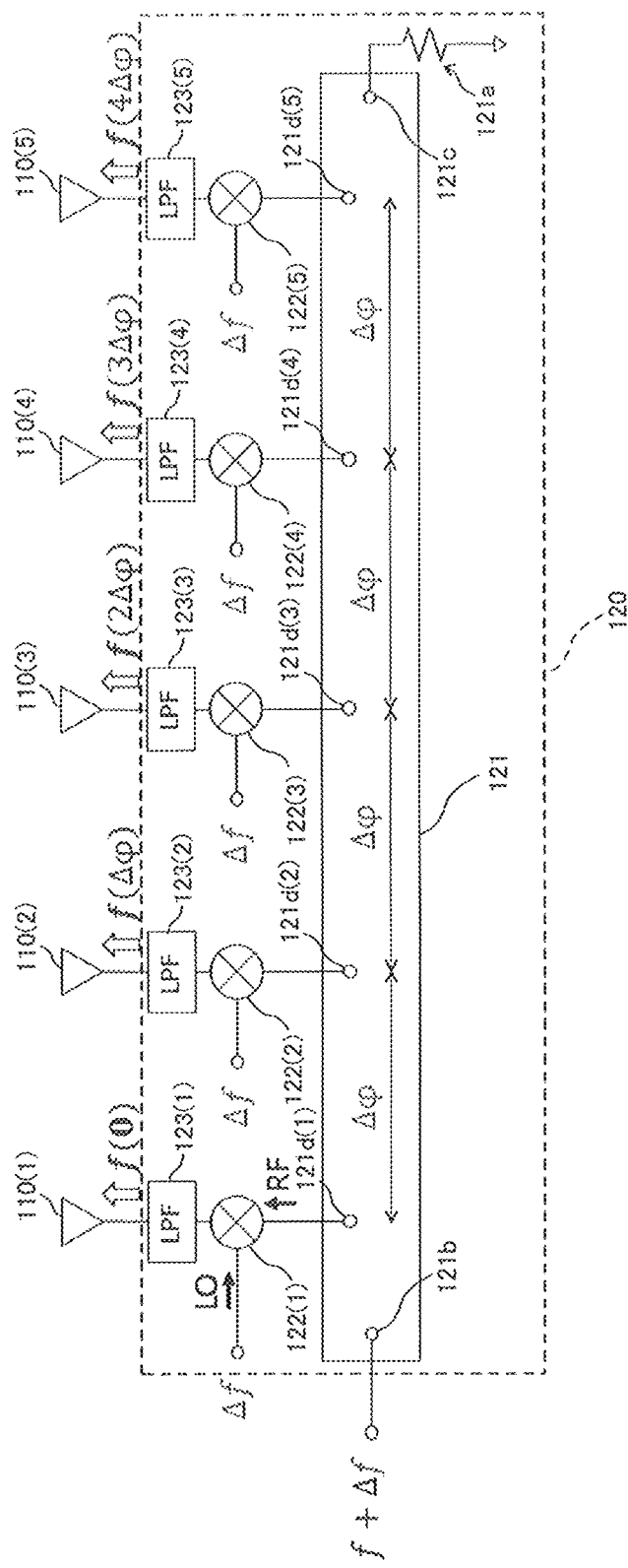
FIG. 4 is an illustration showing a principle of a phased array antenna according to the present embodiment.

FIG. 4 is an illustration showing a principle of the phased array antenna 10 according to the present embodiment. FIG. 4 shows an example of a circuit configuration of the first mixing-signal processing section 120 corresponding to one linear array section in the phased array antenna 10. In the example of FIG. 4, although the number of the plural antenna elements 110(1) to 110(5) included in one linear array section is 5, the number of the plurality of antenna elements included in the linear array section is not limited to those shown in the figure. A variable frequency $\Delta f$ in the figure corresponds to the above-mentioned $\Delta f_1$, and a phase difference $\Delta\varphi$ corresponds to the above-mentioned first phase difference $\Delta\varphi_1$. Further, the above-mentioned second mixing-signal processing section 130 can also output plural signals having the above-mentioned second phase difference $\Delta\varphi_2$ by the same principle as the first mixing-signal processing section 120 in FIG. 4.

In FIG. 4, the first mixing-signal processing section 120 is provided with a first transmission member 121, a plurality of frequency mixers (mixers) 122(1) to 122(5), and a plurality of low-pass filters (LPF) 123(1) to 123(5). The first transmission member 121 is configured with, for example, a traveling-wave type series power distribution circuit substrate such as a microstrip line, and has a phase constant $\beta$ of the transmission line when the electromagnetic wave propagates in the longitudinal direction. The phase constant $\beta$ is expressed by the following equation (1).

$$\beta = \frac{2\pi}{\lambda} = \frac{2\pi(f+\Delta f)}{c} \quad (1)$$

A high frequency signal (first reference signal) input from a first terminal (input terminal) 121b of the first transmission member 121 propagates in the longitudinal direction, and is outputted from a second terminal 121c to a load resistor 121a. The phase difference $\Delta\varphi$ represented by the following equation (2) is generated between adjacent terminals (interval 1) of plural output terminals 121d(1) to 121d(5) of the first transmission member 121 through which the signal (first reference signal) propagates. In the equation (2), l is a transmission line length between the output terminals 121d, and c is a phase velocity in the transmission line.

$$\Delta\varphi = \beta l = \frac{2\pi l(f+\Delta f)}{c} \quad (2)$$

Plural RF signals having the phase difference $\Delta\varphi$ outputted from the plural output terminals 121d(1) to 121d(5) of the first transmission member 121 are input to the plurality of frequency mixers (mixers) 122(1) to 122(5) as the first mixing signals. A local transmission signal (LO signal) with the variable frequency $\Delta f$ is input to the plurality of frequency mixers (mixers) 122(1) to 122(5) as the second mixing signal. The signals outputted from the plurality of frequency mixers (mixers) 122(1) to 122(5) are represented by the following equation (3) in the nth frequency mixer (mixer) viewed from the [0] first terminal (input terminal) 12 lb.

$$\cos 2\pi t(\Delta f) \cdot \cos\{2\pi t(f+\Delta f) + n\Delta\varphi\} = \quad (3)$$
$$\frac{1}{2}[\cos\{2\pi t(f+2\Delta f) + n\Delta\varphi\} + \cos\{2\pi t(f) + n\Delta\varphi\}]$$

After the first term on the right side in the foregoing equation (3) is removed by the plurality of low-pass filters (LPF) 123(1) to 123(5), the signals outputted from the plurality of frequency mixers (mixers) 122(1) to 122(5) are outputted to the plurality of antenna elements 110(1) to 110(5) as plural transmission signals of frequencies f(0), f($\Delta\varphi$), f(2$\Delta\varphi$), f(3$\Delta\varphi$), f(4$\Delta\varphi$) having the phase difference $\Delta\varphi$, The output signal to the nth antenna is represented by, for example, the following equation (4).

$$\text{Output} = \cos\left\{2\pi t(f) + n \cdot \frac{2\pi l(f+\Delta f)}{c}\right\} \quad (4)$$

As shown in the foregoing equation (4), the phase difference $\Delta\varphi$ between the antenna elements 110 can be controlled by performing a frequency control for changing the frequency of the variable frequency $\Delta f$.

Figure 5:
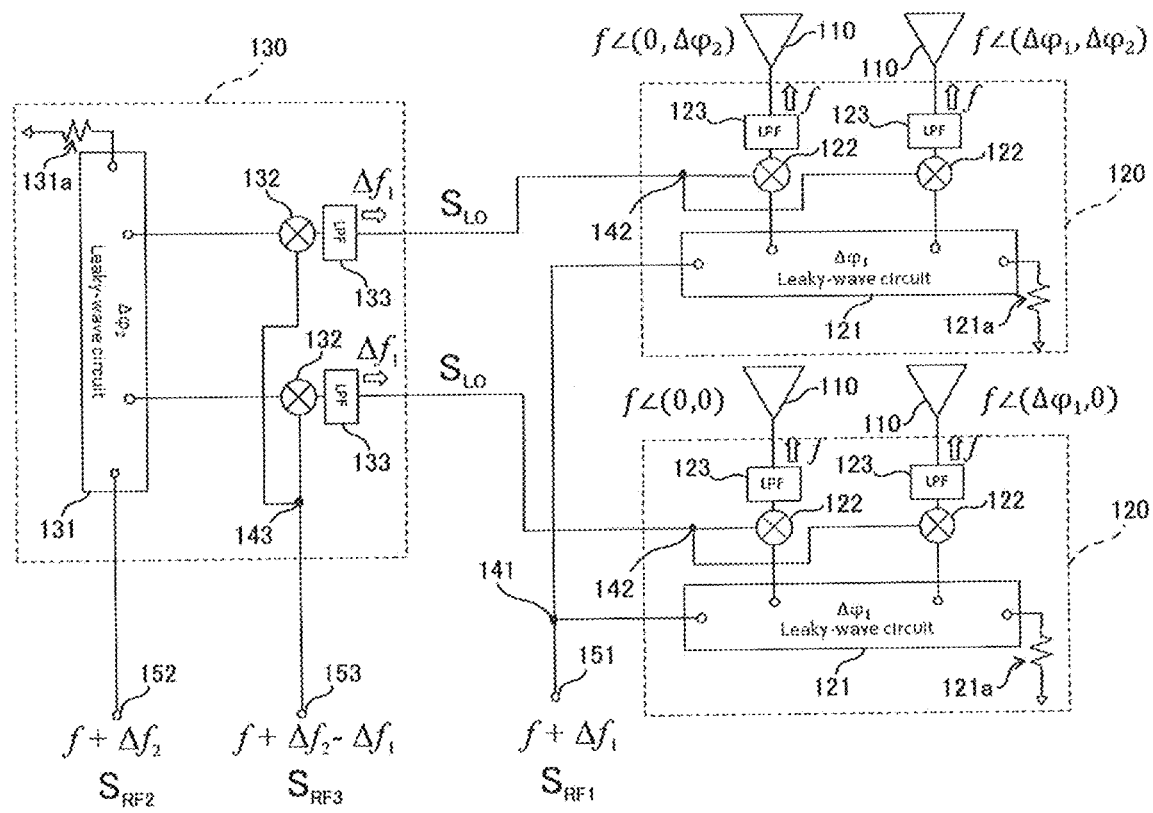
FIG. 5 is an illustration showing an example of a circuit configuration of a phased array antenna according to the present embodiment.

FIG. 5 is an illustration showing an example of a circuit configuration of a phased array antenna according to the present embodiment. In the example of FIG. 5, for convenience of illustration, four antenna elements 110, which are a part of plural antenna elements (4×4=16 elements) included in one linear array section, are described. Further, the description common to FIG. 4 in the circuit configuration of FIG. 5 is omitted.

In FIG. 5, each of the plurality of first mixing-signal processing sections 120 has the first transmission member 121. The first transmission member 121 is configured with, for example, a leakage circuit substrate. The first transmission member 121 is input with the first input signal $S_{RF1}$ with the frequency (f+$\Delta f_1$) supplied from the first signal-dividing section 141 as a reference signal, forms the first phase difference ($\Delta\varphi_1$) by the transmission path length, and outputs the plurality of first mixing signal of the frequency (f+$\Delta f_1$).

The second mixing-signal processing section 130 is provided with a second transmission member 131, a third signal-dividing section 143, and a plurality of frequency mixers 132.

The second transmission member 131 is configured with, for example, a traveling-wave type series power distribution circuit substrate as a transmission-line substrate. The second input member 131 is input with a second input signal with the frequency (f+$\Delta f_2$) that is a sum of the transmission frequency (f) and the second variable frequency ($\Delta f_2$) from the second input port 152, and forms a second phase difference ($\Delta\varphi_2$) by a transmission path length, outputs a plurality of intermediate signals with the frequency (f+$\Delta f_2$), and supplies the intermediate signals to the plurality of frequency mixers 132.

The third signal-dividing section 143 is configured with, for example, Wilkinson Divider. The third signal-dividing section 143 divides the third input signal $S_{RF3}$ with the frequency (f+$\Delta f_2$–$\Delta f_1$) that is a difference between the frequency (f+$\Delta f_2$) of the intermediate signal $S_{LO}$ and the first variable frequency ($\Delta f_1$), into plural signals. The third input signal $S_{RF3}$ is input from the third input port 153.

The plurality of frequency mixers 132 are input with the plurality of intermediate signals (see the foregoing equation (5)) with the frequency (f+$\Delta f_2$) outputted from the second transmission member 131 and the third input signal $S_{RF3}$ with the frequency (f+$\Delta f_2$−$\Delta f_1$) divided by the third signal-dividing section 143, and output the plurality of second mixing signals $S_{LO}$ with the first variable frequency ($\Delta f_1$) having the second phase difference ($\Delta \varphi_2$) via the plurality of low-pass filters (LPF) 133.

The signals outputted from the plural frequency mixers (mixers) 132 are represented by the following equation (5). However, the equation (5) assumes the n2th output port of the second transmission member 131.

$$\cos(2\pi t(f \mid \Delta f_2) \mid n_2\Delta\varphi_2) \cdot \cos 2\pi t(f \mid \Delta f_2 \; \Delta f_1) = \quad (5)$$
$$\frac{1}{2}[\cos\{2\pi t(2f + 2\Delta f_2 - \Delta f_1) + n_2\Delta\varphi_2\} + \cos(2\pi t\Delta f_1 + n_2\Delta\varphi_2)]$$

After the first term on the right side in the foregoing equation (5) is removed by the plurality of low-pass filters (LPF) 133, the signals outputted from the plurality of frequency mixers (mixers) 132 are outputted to the second signal-dividing section 142 of the plurality of first mixing-signal processing sections 120 as the plurality of second mixing signal $S_{LO}$ with the first variable frequencies ($\Delta f_1$) having the second phase difference $\Delta\varphi_2$.

The second signal-dividing section 142 divides the second mixing signal $S_{LO}$ with the first variable frequency ($\Delta f_1$) having the second phase difference $\Delta\varphi_2$ outputted from the second mixing-signal processing section 130, and supplies the divided signals to the plurality of frequency mixers (mixers) 122 of the first mixing-signal processing section 120. A first mixing signal with the frequency (f+$\Delta f_1$) having the first phase difference 491 is input to the plurality of frequency mixers (mixers) 122 as the first mixing signal. The signals outputted from the plurality of frequency mixers (mixers) 122 are represented by the following equation (6). The $n_1$ and $n_2$ in the equation (6) are output-port numbers when viewing from the first terminal (input terminal) 121b of the output terminal 121d in the first mixing-signal processing section 120 and the second mixing-signal processing section 130.

$$\cos\{2\pi t(f + \Delta f_1) + n_1\Delta\varphi_1\} \cdot \cos(2\pi t\Delta f_1 + n_2\Delta\varphi_2) = \quad (6)$$
$$\frac{1}{2}[\cos\{2\pi t(f + 2\Delta f_1) + n_1\Delta\varphi_1 + n_2\Delta\varphi_2\} + \cos(2\pi tf + n_1\Delta\varphi_1 - n_2\Delta\varphi_2)]$$

After the first term on the right side in the foregoing equation (6) is removed by the plurality of low-pass filters (LPF) 123, the signals outputted from the plurality of frequency mixers (mixers) 122 are outputted to the plurality of antenna elements 110 as a plurality of transmission signals with a frequency f having the first phase difference $\Delta\varphi_1$ and the second phase difference $\Delta\varphi_2$. The output signals are represented by, for example, the following equation (7).

$$\text{output} = \cos\left\{2\pi tf + n_1\Delta\frac{2\pi l(f+\Delta f_1)}{c} - n_2\Delta\frac{2\pi l(f+\Delta f_2)}{c}\right\} \quad (7)$$

Figure 6:
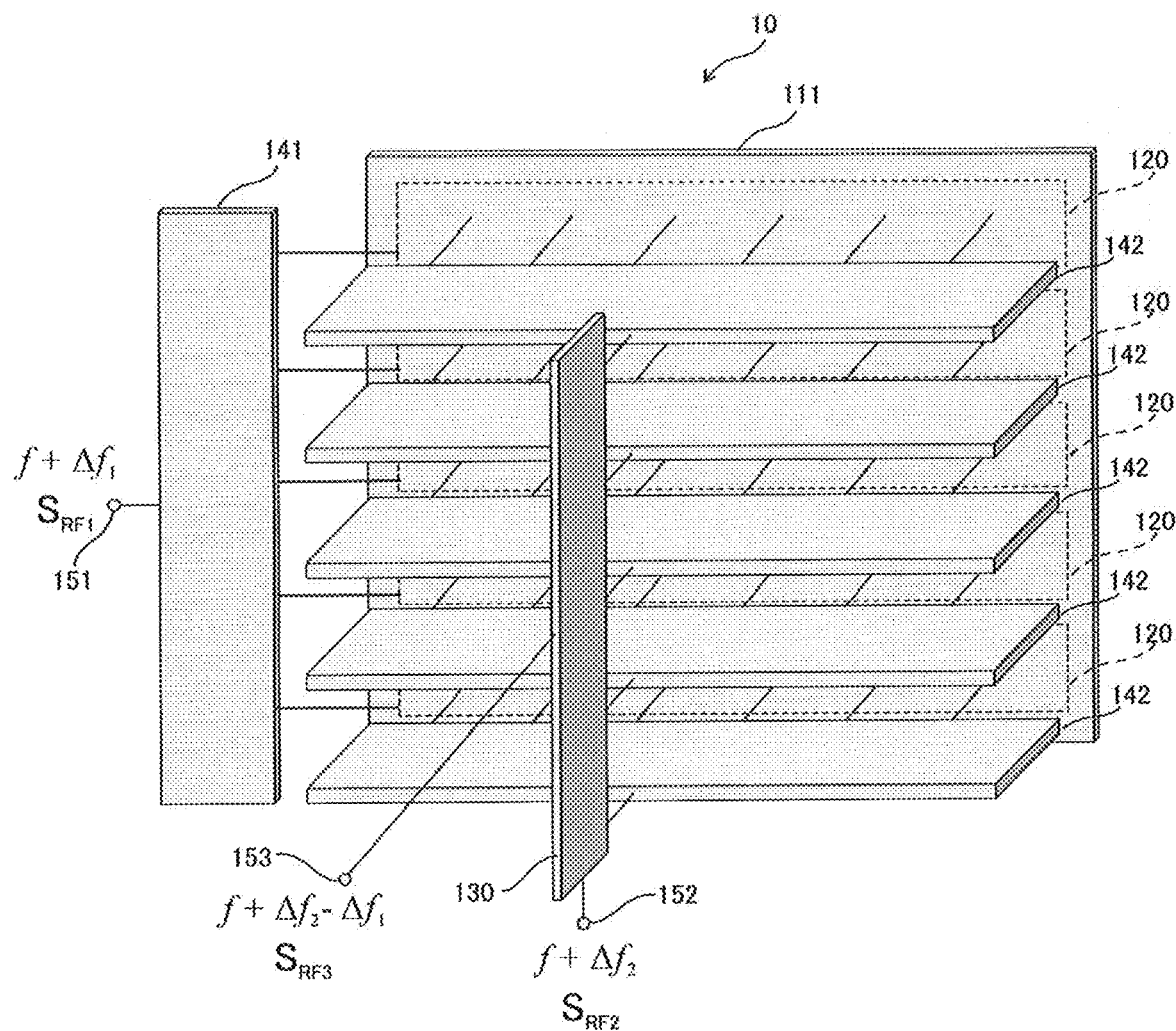
FIG. 6 is an illustration showing an example of a substrate configuration of the phased array antenna in FIG. 5.

FIG. 6 is an illustration showing an example of a substrate configuration of the phased array antenna 10 in FIG. 5. In FIG. 6, the plurality of first mixing-signal processing sections 120 are formed on the back surface of the antenna main substrate 111 in which the plurality of antenna elements of the phased array antenna 10 are formed on the front surface. The plurality of second signal-dividing sections 142 having a long substrate shape are arranged so as to extend in the longitudinal direction of the plurality of first mixing-signal processing sections 120. The second mixing-signal processing section 130 having a long substrate shape is arranged so as to span the whole of the plurality of second signal-dividing sections 142. On a side portion of the antenna main substrate 111 close to one end in the longitudinal direction of the plurality of first mixing-signal processing sections 120, the first signal-dividing section 141 having a long substrate shape is arranged so as to correspond to the end portions of the plurality of first mixing-signal processing sections 120. The first signal-dividing section 141 supplies the first input signal $S_{RF1}$ with the frequency (f+$\Delta f_1$), to each of the plurality of first mixing-signal processing sections 120.

According to the configuration example of the phased array antenna 10 in FIG. 5 and FIG. 6, the number of the input ports 151 to 153 can be reduced to three, and the number of the frequency mixers (mixers) can be reduced to 20 in case of 4×4=16 of antenna elements 110. For example, assuming that the number of the antenna elements 110 is n×n, the number of the frequency mixers (mixers) can be reduced to n×(n+1). The number of the signal-dividing sections 141 to 143 can also be reduced to three. Further, the overall thickness of the phased array antenna 10 can be reduced to about the sum of the width of the substrate of the second mixing-signal processing section 130 and the width of the substrate of the second signal-dividing section 142.

Figure 7:
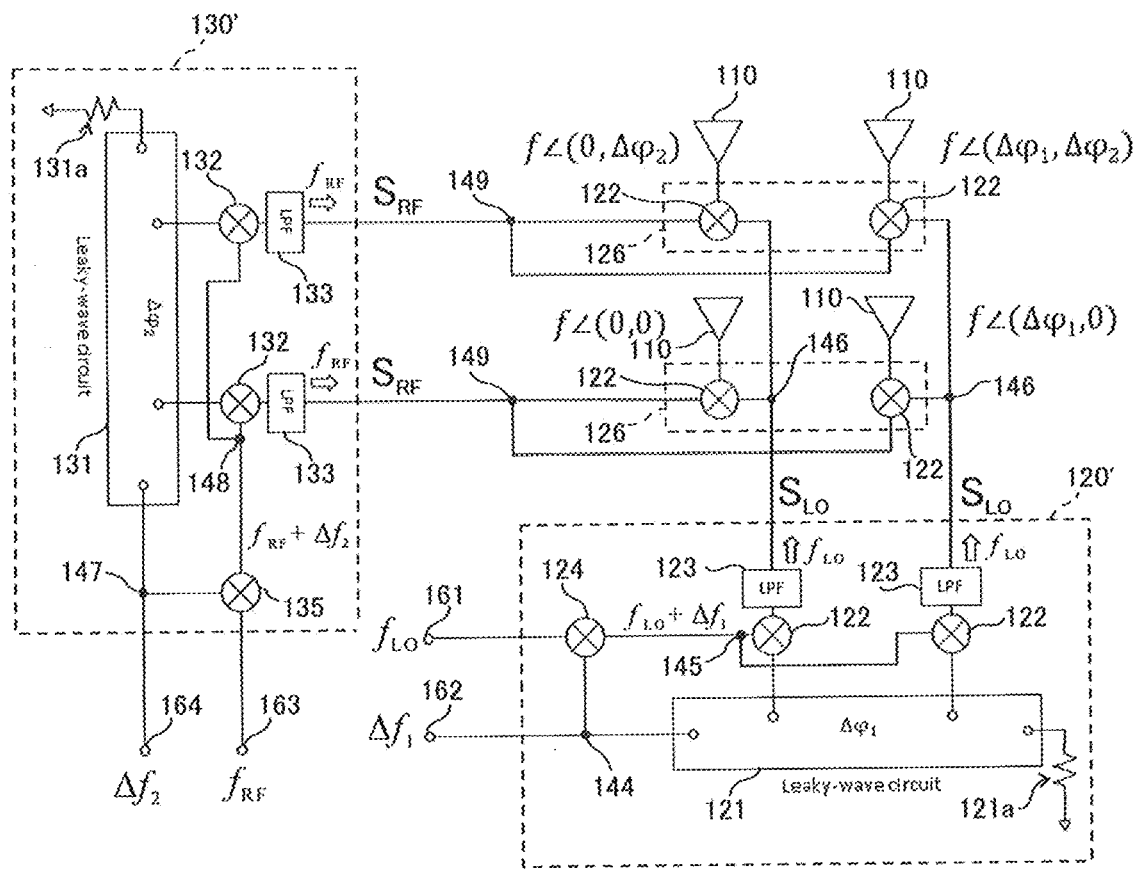
FIG. 7 is an illustration showing a schematic configuration of a phased array antenna according to a comparative reference example.

FIG. 7 is an illustration showing a circuit configuration of a phased array antenna according to a comparative reference example. The configuration in FIG. 7 is a circuit configuration corresponding to the phased array antenna disclosed in Non-Patent Literature 2 described above. In the circuit configuration of the phased array antenna of FIG. 7, four input ports 161 to 164 are required, which are larger in number than in the circuit configuration of the present embodiment, and the number of the frequency mixers (mixers) 122, 124, 132 and 135 is also larger in number than in the circuit configuration of the present embodiment. For example, in case of the antenna elements 110 of 4×4=16 of, the number of the frequency mixers (mixers) is 27, assuming that the number of the antenna elements 110 is n×n, the number of the frequency mixers (mixers) is $(n+1)^2+2$. The number of the signal-dividing sections 144 to 149 is also six, which is larger in number than in the circuit configuration of the present embodiment. Further, the total thickness of the phased array antenna 10 in FIG. 7 is about three times the width of the substrate, which is thicker than the circuit configuration of the present embodiment.

Figure 8:
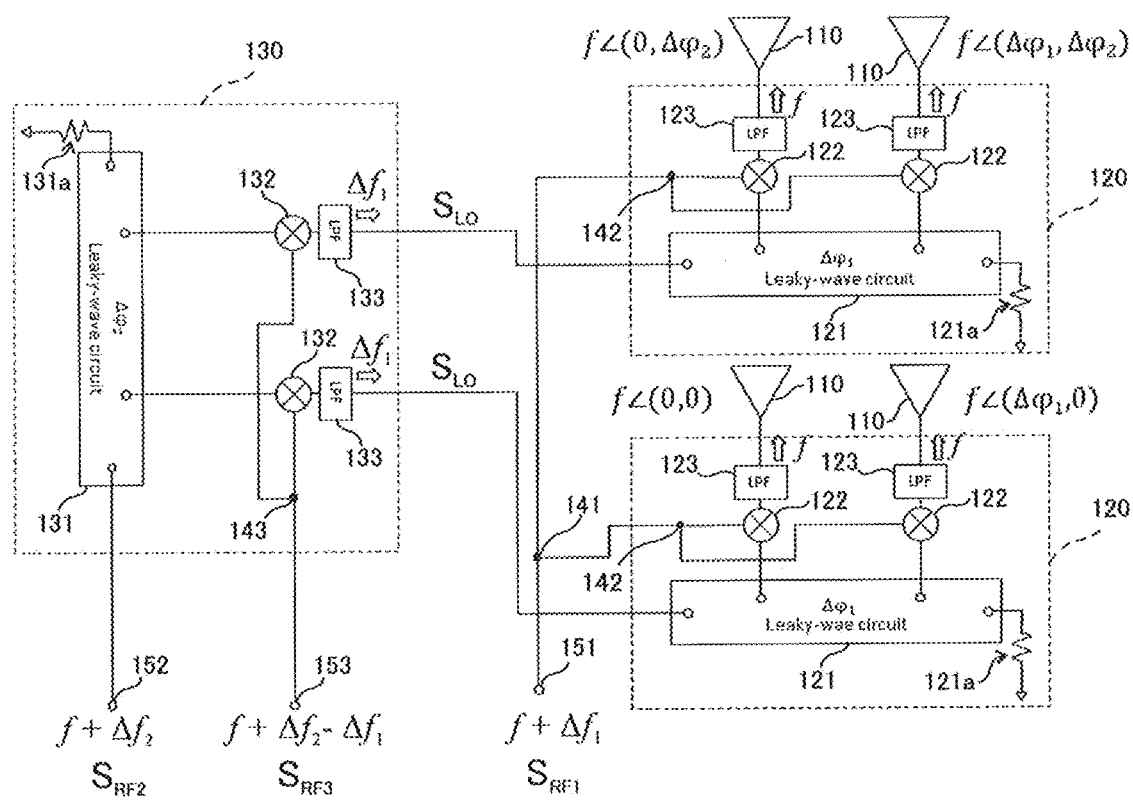
FIG. 8 is an illustration showing another example of a schematic configuration of a phased array antenna according to the present embodiment.

FIG. 8 is an illustration showing another example of a schematic configuration of a phased array antenna according to the present embodiment. In the example of FIG. 8, for convenience of illustration, four antenna elements 110 are described, which are a part of the plurality of antenna elements (4×4=16 elements) included in one linear array section. In the circuit configuration of FIG. 8, the description common to FIG. 4 and FIG. 5 is omitted.

In FIG. 8, the plurality of first mixing-signal processing sections 120 include the plurality of frequency mixers 122 for supplying transmission signals with a predetermined transmission frequency (f), to the plurality of antenna elements 110 of the linear array section. The plurality of first mixing-signal processing sections 120 supply the plurality of first mixing signals with the first variable frequency ($\Delta f_1$) having a predetermined first phase difference ($\Delta \varphi_1$) and a second phase difference ($\Delta \varphi_2$) between the antenna elements adjacent to each other in the arrangement direction of the plurality of antenna elements 110 of the linear array section, to the plurality of mixers 122.

The first signal-dividing section 141 divides the first input signal with a frequency (f+$\Delta f_1$) that is the sum of the transmission frequency (f) and the first variable frequency ($\Delta f_1$).

The plurality of second signal-dividing sections 142 are provided so as to respectively correspond to the plurality of linear array sections, and further divide the first input signal with the frequency (f+$\Delta f_1$) supplied from the first signal-dividing section 141 and supply the divided signals to the plurality of frequency mixers 122 as the second mixing signals.

In the example of FIG. 8, the above-mentioned second mixing-signal processing section 130 functions as an intermediate-signal supplying section. The intermediate-signal supplying section 130 supplies a plurality of intermediate signals $S_{LO}$ with the first variable frequencies ($\Delta f_1$) having the second phase difference $\Delta \varphi_2$ to the plurality of first mixing-signal processing sections 120.

In FIG. 8, each of the plurality of first mixing-signal processing sections 120 is provided with a first transmission member 121 that is input with an intermediate signal with the first variable frequency ($\Delta f_1$) having the second phase difference ($\Delta \varphi_2$) supplied from the intermediate-signal supplying section 130, and the first transmission member 121 forms the first phase difference ($\Delta \varphi_1$) by a transmission path length and outputs the plurality of first mixing signal with the first variable frequency ($\Delta f_1$).

The intermediate-signal supplying section 130 is provided with a second transmission member 131, a third signal-dividing section 143 and a plurality of frequency mixers 132.

The second transmission member 131 is input with a second input signal $S^{RF2}$ with a frequency (f+$\Delta f_2$) that is a sum of the transmission frequency (f) and the second variable frequency ($\Delta f_2$), and the second transmission member 131 forms the second phase difference ($\Delta \varphi_2$) with a transmission path length and outputs a plurality of intermediate signals with the frequency (f+$\Delta f_2$).

The third signal-dividing section 143 divides a third input signal $S_{RF3}$ with a frequency (f+$\Delta f_2$−$\Delta f_1$) that is a difference between the frequency (f+$\Delta f_2$) and the first variable frequency ($\Delta f_1$), into plural signals.

The plurality of frequency mixers 132 mix the plurality of intermediate signals with the frequency (f+$\Delta f_2$) having the second phase difference ($\Delta \varphi_2$) outputted from the second transmission member 131 and the third input signals with the frequency (f+$\Delta f_2$-$\Delta f_1$) divided by the third signal-dividing section 143, and output a plurality of intermediate signals $S_{LO}$ with the first variable frequency ($\Delta f_1$) having the second phase difference ($\Delta \varphi_2$) via the plural low-pass filters (LPF) 133. The plurality of intermediate signals $S_{LO}$ with the first variable frequency ($\Delta f_1$) are supplied to the first transmission members 121 of the plurality of first mixing-signal processing sections 120.

The plurality of first mixing signals with the first variable frequency ($\Delta f_1$) having the first phase difference ($\Delta \varphi_1$) and the second phase difference ($\Delta \varphi_2$) are input to the plurality of frequency mixers 122 from the first transmission members 121 of the plurality of first mixing-signal processing sections 120. The second mixing signals with the frequency (f+$\Delta f_1$) are input to the plurality of frequency mixers 122 from the plurality of second signal-dividing sections 142.

The signals outputted from the plurality of frequency mixers (mixers) 122 are outputted to the plurality of antenna elements 110 as a plurality of transmission signals with a frequency f having the first phase difference $\Delta \varphi_1$ and the second phase difference $\Delta \varphi_2$ via the plurality of low-pass filters (LPF) 123.

Figure 9:
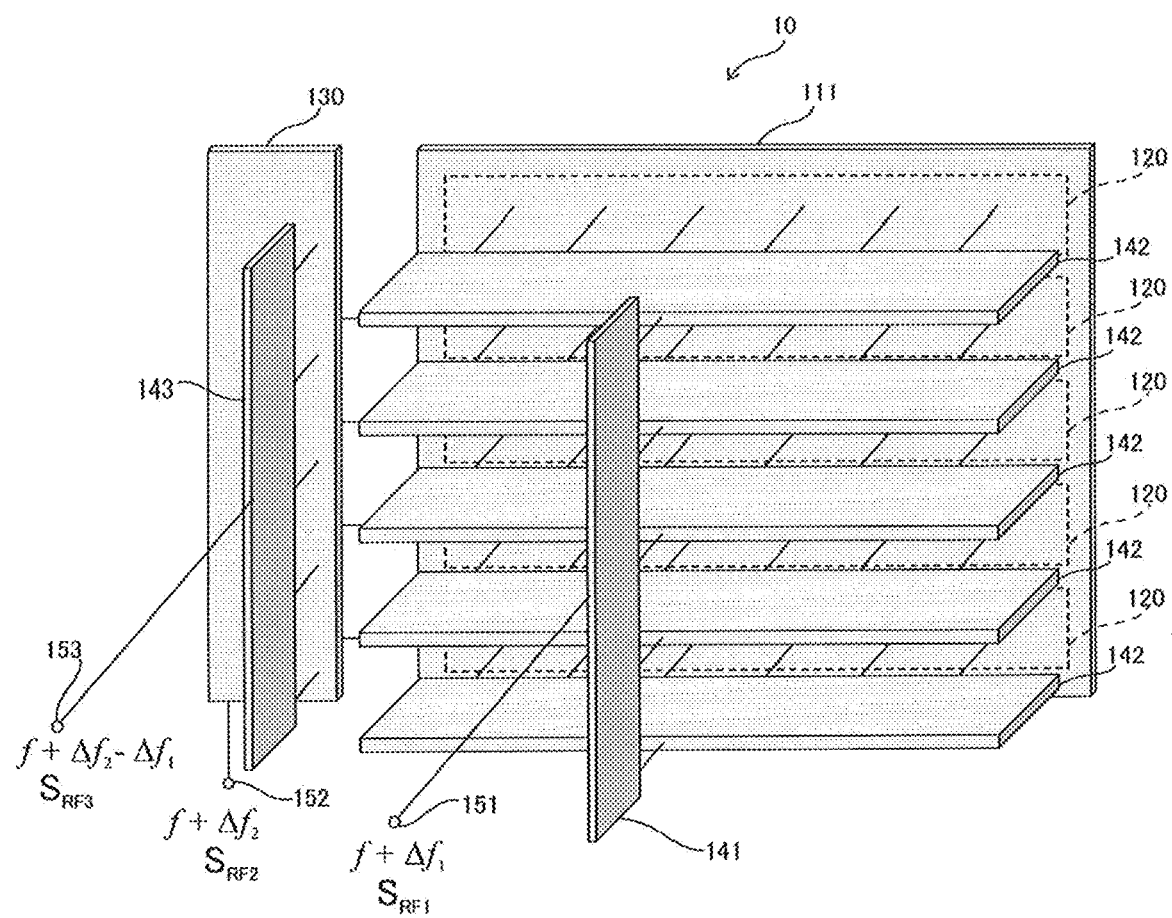
FIG. 9 is an illustration showing an example of a substrate configuration of the phased array antenna in FIG. 8.

FIG. 9 is an illustration showing an example of a substrate configuration of the phased array antenna in FIG. 8. In FIG. 9, the description of the parts common to those in FIG. 6 described above is omitted. In the substrate configuration of FIG. 9, the first signal-dividing section 141 having a long substrate shape is arranged so as to span the whole of the plurality of second signal-dividing sections 142. The first signal-dividing section 141 divides the first input signal with the frequency (f+$\Delta f_1$) and supplies the divided signals to each of the plurality of second signal-dividing sections 142. On the side of the antenna main substrate 111 close to one end in the longitudinal direction of the plurality of first mixing-signal processing sections 120, the second mixing-signal processing section 130 having a long substrate shape is arranged so as to correspond to the end portions of the plurality of first mixing-signal processing sections 120. The second mixing-signal processing section 130 supplies the intermediate signal $S_{LO}$ with the first variable frequency ($\Delta f_1$) to each of the plurality of first mixing-signal processing sections 120. The second input signal $S_{RF2}$ with the frequency (f+$\Delta f_2$) is input to the second mixing-signal processing section 130, and the plurality of third input signals $S_{RF3}$ with the frequency (f+$\Delta f_2$−$\Delta f_1$) divided by the third signal-dividing section 143 are input to the second mixing-signal processing section 130.

According to the configuration example of the phased array antenna 10 of FIG. 8 and FIG. 9, the same as the configuration example of FIG. 5 and FIG. 6 described above, the number of the input ports 151 to 153 can be reduced to three, and the number of the frequency mixers (mixers) can be reduced to 20 in case of the antenna elements 110 of 4×4=16. For example, assuming that the number of the antenna elements 110 is n×n, the number of the frequency mixers (mixers) can be reduced to n×(n+1). The number of the signal-dividing sections 141 to 143 can also be reduced to three. Further, the overall thickness of the phased array antenna 10 can be reduced to about the sum of the width of the substrate of the second mixing-signal processing section 130 and the width of the substrate of the second signal-dividing section 142.

Figure 10:
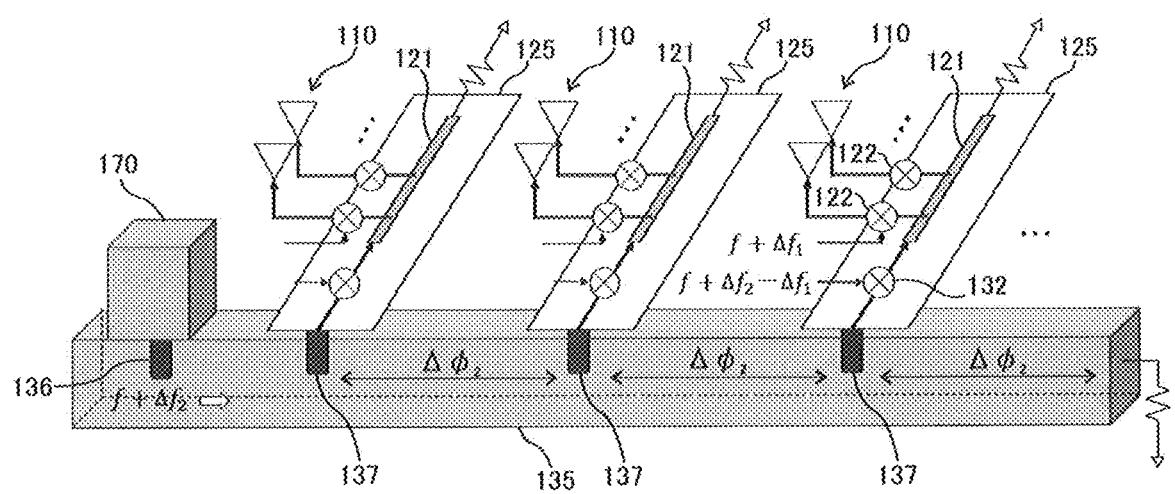
FIG. 10 is an illustration showing an example of a high-power supporting configuration in the phased array antenna of FIG. 8.

FIG. 10 is an illustration showing an example of a high-power supporting configuration in the phased array antenna of FIG. 8. In the configuration example of FIG. 10, the configuration is provided with a plurality of transmission-line substrates 125 arranged in parallel with each other at predetermined intervals. Each of the plurality of transmission-line substrates 125 includes the first transmission member 121 and the plurality of frequency mixers 122 in the first mixing-signal processing section 120 described above, and the frequency mixer 132 in the second mixing-signal processing section 130 described above. As the second transmission member of the second mixing-signal processing section 130 described above, it is provided with a waveguide 135 extending in the arrangement direction of the plurality of transmission-line substrates 125. A high-power transmitter 170 is attached to the end of the waveguide 135.

The high-power transmitter 170 radiates an electromagnetic wave with a frequency (f+$\Delta f_2$) into the waveguide 135 via a coupler 136.

The electromagnetic wave with the frequency (f+$\Delta f_2$) introduced from the end of the waveguide 135 propagates in the longitudinal direction of the waveguide 135 and is sequentially supplied to the ends of the plurality of transmission-line substrates 125 via a waveguide-transmission line converter 137. The frequency mixer 132 is input with the signal with the frequency (f+$\Delta f_2$) having the second phase difference $\Delta\varphi_2$ between the linear array sections supplied to the end of the transmission-line substrate 125 and a third input signal with the frequency (f+$\Delta f_2$−$\Delta f_1$). The frequency mixer 132 supplies the intermediate signal with the frequency ($\Delta$f1) having the second phase difference $\Delta\varphi_2$ between the linear array sections, to the first transmission member 121.

According to the phased array antenna 10 in FIG. 10, it is possible to transmit a high-power electromagnetic wave in which the directional beam Bm can be controlled in an arbitrary direction with a simple configuration.

As described above, according to the phased array antenna 10 of the present embodiments, it is possible to provide a two-dimensional phased array antenna having a simple configuration capable of reducing the number of control systems and the number of control input ports for phase control of the antenna element 110.

Further, according to the phased array antenna 10 of the present embodiments, the number of control systems for phase control of the antenna element 110 can be suppressed without limiting a variable angle range in the main direction of the directional beam Bm, and a simple and inexpensive configuration can be achieved, compared to the conventional phased array antenna with a sub-array configuration.

A transmission apparatus can be configured with the phased array antenna 10 of the present embodiments by combining with one or plural frequency controllable transmitters that generate the above-mentioned plural input signals supplied to the phased array antenna 10. The phased array antenna 10 of the present embodiments can be used for at least one of the transmission antenna and the reception antenna for radio power transmission in the radio-power transmission system, or can be used for at least one of the transmission antenna and the reception antenna for radio communication in the radio communication system.

It is noted that, the process steps and configuration elements of the phased array antenna, the transmission apparatus, the radio-power transmission system and the radio communication system described in the present description can be implemented with various means. For example, these process steps and configuration elements may be implemented with hardware, firmware, software, or a combination thereof.

With respect to hardware implementation, means such as processing units or the like used for establishing the foregoing steps and configuration elements in entities (for example, radio relay station, feeder station, gateway station, base station, base station apparatus, radio-relay station apparatus, terminal apparatus (user apparatus, mobile station, communication terminal), management apparatus, monitoring apparatus, remote control apparatus, server, hard disk drive apparatus, or optical disk drive apparatus) may be implemented in one or more of an application-specific IC (ASIC), a digital signal processor (DSP), a digital signal processing apparatus (DSPD), a programmable logic device (PLD), a field programmable gate array (FPGA), a processor, a controller, a microcontroller, a microprocessor, an electronic device, other electronic unit, computer, or a combination thereof, which are designed so as to perform a function described in the present specification.

With respect to the firmware and/or software implementation, means such as processing units or the like used for establishing the foregoing configuration elements may be implemented with a program (for example, code such as procedure, function, module, instruction, etc.) for performing a function described in the present specification. In general, any computer/processor readable medium of materializing the code of firmware and/or software may be used for implementation of means such as processing units and so on for establishing the foregoing steps and configuration elements described in the present specification. For example, in a control apparatus, the firmware and/or software code may be stored in a memory and executed by a computer or processor. The memory may be implemented within the computer or processor, or outside the processor. Further, the firmware and/or software code may be stored in, for example, a medium capable being read by a computer or processor, such as a random-access memory (RAM), a read-only memory (ROM), a non-volatility random-access memory (NVRAM), a programmable read-only memory (PROM), an electrically erasable PROM (EEPROM), a FLASH memory, a floppy (registered trademark) disk, a compact disk (CD), a digital versatile disk (DVD), a magnetic or optical data storage unit, or the like. The code may be executed by one or more of computers and processors, and a certain aspect of functionalities described in the present specification may by executed by a computer or processor.

The medium may be a non-transitory recording medium. Further, the code of the program may be executable by being read by a computer, a processor, or another device or an apparatus machine, and the format is not limited to a specific format. For example, the code of the program may be any of a source code, an object code, and a binary code, and may be a mixture of two or more of those codes.

The description of embodiments disclosed in the present specification is provided so that the present disclosures can be produced or used by those skilled in the art. Various modifications of the present disclosures are readily apparent to those skilled in the art and general principles defined in the present specification can be applied to other variations without departing from the spirit and scope of the present disclosures. Therefore, the present disclosures should not be limited to examples and designs described in the present specification and should be recognized to be in the broadest scope corresponding to principles and novel features disclosed in the present specification.

REFERENCE SIGNS LIST

10: phased array antenna
100: linear array section
110: antenna element
111: antenna main substrate
120: first mixing-signal processing section
121: first transmission member
122: frequency mixer
125: transmission-line substrate
130: second mixing-signal processing section, intermediate-signal supplying section
131: second transmission member
132: frequency mixer
135: waveguide
136: coupler 137: transmission line converter
141: first signal-dividing section
142: second signal-dividing section
143: third signal-dividing section
151: first input port
152: second input port
153: third input port
170: high-power transmitter

The invention claimed is:

1. A phased array antenna comprising:
a plurality of antenna elements arranged in a first direction and a second direction intersecting the first direction;
a plurality of first mixing signal processing sections that generate a plurality of first mixing signals having a predetermined first phase difference ($\Delta\phi_1$) between antenna elements adjacent to each other in the first direction based on one of three frequency-controllable signals with respective frequencies different from each other;
a second mixing signal processing section that generates a plurality of second mixing signals having a predetermined second phase difference ($\Delta\phi_2$) between antenna elements adjacent to each other in the second direction based on two of the three frequency-controllable signals with respective frequencies different from each other; and
a plurality of frequency mixers that receive the plurality of first mixing signals and the plurality of second mixing signals from the mixing signal processing sections and supply transmission signals with a predetermined transmission frequency (f), to the plurality of antenna elements.

2. The phased array antenna according to claim 1, comprising:
a plurality of linear array sections that respectively include a plurality of antenna elements arranged in a first direction, and are arranged in a second direction intersecting the first direction, wherein the plurality of first mixing signal processing sections is provided so as to respectively correspond to the plurality of linear array sections, wherein the plurality of first mixing signal processing sections comprise a plurality of frequency mixers that supply transmission signals with a predetermined transmission frequency (f) to the plurality of antenna elements of the linear array section, and supply the plurality of first mixing signals with a frequency (f+$\Delta f_1$) that is a sum of the transmission frequency (f) and a first variable frequency ($\Delta f_1$) having the predetermined first phase difference ($\Delta\phi_1$) between the antenna elements adjacent to each other in the arrangement direction of the plurality of antenna elements of the linear array section, to the plurality of frequency mixers;
a first signal-dividing section for dividing a first input signal with a frequency (f+$\Delta f_1$) that is a reference of the plurality of first mixing signals having the first phase difference ($\Delta\phi_1$), and respectively supplying the first input signal to the plurality of first signal-processing sections, wherein the second mixing-signal processing section outputs the second mixing signals with the first variable frequency ($\Delta f_1$) having a predetermined second phase difference ($\Delta\phi_2$) between the linear array sections adjacent to each other in the arrangement direction of the plurality of linear array sections; and
a plurality of second signal-dividing sections that are provided so as to respectively correspond to the plurality of linear array sections, wherein the plurality of second signal-dividing sections respectively divide the plurality of second mixing signals with the first variable frequency ($\Delta f_1$) having the second phase difference ($\Delta\phi_2$) outputted from the second mixing-signal processing section, and supply the plurality of second mixing signals to the plurality of frequency mixers of the linear array section.

3. The phased array antenna according to claim 2,
wherein each of the plurality of first mixing-signal processing sections comprises a first transmission member that is input with a first reference signal with the frequency (f+$\Delta f_1$) supplied from the first signal-dividing section, forms the first phase difference ($\Delta\phi_1$) by a transmission path length and outputs the plurality of first mixing signals with the frequency (f+$\Delta f_1$), and
wherein the second mixing signal processing section comprises:
a second transmission member that is input with a second input signal of a frequency (f+$\Delta f_2$) of a sum of the transmission frequency (f) and the second variable frequency ($\Delta f_2$), forms the second phase difference ($\Delta\phi_2$) by a transmission path length and outputs a plurality of intermediate signals with the frequency (f+$\Delta f_2$);
a third signal-dividing section for dividing a third input signal with a frequency (f+$\Delta f_2$−$\Delta f_1$) that is a difference between the frequency (f+$\Delta f_2$) of the intermediate signal and the first variable frequency ($\Delta f_1$), into plural signals; and
a plurality of frequency mixers that are input with the plurality of intermediate signals with the frequency (f+$\Delta f_2$) outputted from the second transmission member and the third input signal with the frequency (f+$\Delta f_2$−$\Delta f_1$) divided by the third signal-dividing section and outputs the plurality of second mixing signals with the first variable frequency ($\Delta f_1$) having the second phase difference ($\Delta\phi_2$).

4. The phased array antenna according to claim 1, comprising:
a plurality of linear array sections that respectively comprise a plurality of antenna elements arranged in a first direction, the plurality of linear array sections being arranged in a second direction intersecting the first direction, wherein the plurality of first mixing-signal processing sections is provided so as to respectively correspond to the plurality of linear array sections, wherein the plurality of the first mixing-signal processing sections comprise a plurality of frequency mixers that supply transmission signals with a predetermined transmission frequency (f) to the plurality of antenna elements of the linear array section, and supply the plurality of first mixing signals with a first variable frequency ($\Delta f_1$) having a predetermined first phase difference ($\Delta\phi_1$) and second phase difference ($\Delta\phi_2$) between the antenna elements adjacent to each other in the arrangement direction of the plurality of antenna elements of the linear array section, to the plurality of frequency mixers;
a first signal-dividing section for dividing a first input signal with a frequency (f+$\Delta f_1$) that is a sum of the transmission frequency (f) and the first variable frequency ($\Delta f_1$);
a plurality of second signal-dividing sections that are provided so as to correspond to the plurality of linear array sections and further divide the first input signal supplied from the first signal-dividing section and supply the first input signal to the plurality of frequency mixers as the second mixing signals; and an intermediate-signal supplying section for supplying a plurality of intermediate signals with the first variable frequency ($\Delta f_1$) having the second phase difference ($\Delta \phi_2$) between the linear array sections adjacent to each other in the arrangement direction of the plurality of linear array sections, to the plurality of the first mixing-signal processing sections.

5. The phased array antenna according to claim 4, wherein each of the plurality of first mixing-signal processing sections comprises a first transmission member that is input with an intermediate signal with the first variable frequency ($\Delta f_1$) supplied from the intermediate-signal supplying section, forms the first phase difference ($\Delta \phi_1$) by a transmission path length and outputs the plurality of first mixing signals with the first variable frequencies ($\Delta f_1$), and wherein the intermediate-signal supplying section comprises:

- a second transmission member that is input with a second input signal of a frequency ($f+\Delta f_2$) of a sum of the transmission frequency (f) and the second variable frequency ($\Delta f_2$), forms the second phase difference ($\Delta \phi_2$) by a transmission path length and outputs a plurality of intermediate signals with the frequency ($f+\Delta f_2$);
- a third signal-dividing section for dividing a third input signal with a frequency ($f+\Delta f_2-\Delta f_1$) that is a difference between the frequency ($f+\Delta f_2$) and the first variable frequency ($\Delta f_1$), into plural signals; and
- a plurality of frequency mixers for mixing the plurality of intermediate signals with the frequency ($f+\Delta f_2$) outputted from the second transmission member and the third input signal with the frequency ($f+\Delta f_2-\Delta f_1$) divided by the third signal-dividing section, and outputting the plurality of intermediate signals with the first variable frequency ($\Delta f_1$).

6. The phased array antenna according to claim 3, wherein each of the first transmission member and the second transmission member is a transmission-line substrate.

7. The phased array antenna according to claim 3, wherein the phased array antenna comprises a plurality of transmission-line substrates that include the first transmission member and the plurality of frequency mixers in the first mixing-signal processing section and the frequency mixer in the second mixing-signal processing section, and wherein the second transmission member of the second mixing-signal processing section is a waveguide, and wherein an output section for outputting the plurality of intermediate signals with the frequency ($f+\Delta f_2$) includes a converter for converting the waveguide to a transmission line.

8. The phased array antenna according to claim 5, wherein the phased array antenna comprises a plurality of transmission-line substrates that include the first transmission member and the plurality of frequency mixers in the first mixing-signal processing section and the frequency mixer in the intermediate-signal supplying section, and wherein the second transmission member of the intermediate-signal supplying section is a waveguide, and wherein an output section for outputting the plurality of intermediate signals with the frequency ($f+\Delta f_2$) includes a converter for converting the waveguide to a transmission line.

9. A transmission apparatus comprising:

the phased array antenna according to claim 1; and one or more frequency-controllable transmitters that generate the plurality of input signals supplied to the phased array antenna.

10. A radio-power transmission system comprising the phased array antenna according to claim 1 as a transmission antenna for radio power transmission.

11. A radio communication system comprising the phased array antenna according to claim 1 as a transmission antenna for radio communication.

12. The phased array antenna according to claim 5, wherein each of the first transmission member and the second transmission member is a transmission-line substrate.

* * * * *